United States Patent [19]  [11] 4,298,513
Distler et al. [45] Nov. 3, 1981

[54] BINDER FOR PAPER-COATING COMPOSITIONS

[75] Inventors: Dieter Distler, Mutterstadt; Margarete Mueller; Hans-Georg Bubam, both of Ludwigshafen; Guenther Addicks, Ludwigshafen, all of Fed. Rep. of Germany

[73] Assignee: BASF Aktiengesellschaft, Ludwigshafen, Fed. Rep. of Germany

[21] Appl. No.: 186,844

[22] Filed: Sep. 15, 1980

[30] Foreign Application Priority Data

Sep. 29, 1979 [DE] Fed. Rep. of Germany ....... 2939657

[51] Int. Cl.$^3$ .............................................. C08L 33/02
[52] U.S. Cl. .............................. 260/29.7 H; 526/272; 526/307.6; 526/307.7
[58] Field of Search .................. 260/29.7 H; 526/272, 526/303

[56] References Cited

U.S. PATENT DOCUMENTS 3,487,032 12/1969 Guziak ............................... 260/29.7

FOREIGN PATENT DOCUMENTS 1546316 4/1970 Fed. Rep. of Germany .
1174274 12/1969 United Kingdom .

*Primary Examiner*—Paul R. Michl
*Attorney, Agent, or Firm*—Oblon, Fisher, Spivak, McClelland & Maier

[57] ABSTRACT

A low-odor aqueous binder dispersion containing as copolymerized units, and based on solids content,
(a) from 25 to 57.5% by weight of butadiene or of butadiene and an acrylic acid ester, the content of copolymerized butadiene being not less than 15% by weight,
(b) from 40 to 70% by weight of styrene,
(c) from 1 to 5% by weight of maleic acid or maleic anhydride and
(d) from 1.5 to 7% by weight of methacrylamide, for use in paper-coating compositions.

9 Claims, No Drawings

BINDER FOR PAPER-COATING COMPOSITIONS

British Pat. No. 1,174,274 discloses paper-coating compositions which contain from 1 to 25 parts by weight of a synthetic binder per 100 parts by weight of a finely divided pigment. The synthetic binder consists of a mixture of copolymers A and B, and suitable copolymers A include, inter alia, copolymers of from 20 to 70% by weight of styrene and/or acrylonitrile, from 20 to 80% by weight of butadiene, from 0 to 30% by weight of acrylic acid esters or methacrylic acid esters and from 0 to 10% by weight of other ethylenically unsaturated monomers. Copolymer B has a K value of from 12 to 40 and consists of from 60 to 95% by weight of acrylic acid esters or methacrylic acid esters, from 5 to 40% by weight of ethylenically unsaturated carboxylic acids and from 0 to 10% by weight of other ethylenically unsaturated monomers. The mixture of copolymers A and B contains from 0.5 to 10% by weight of copolymer B.

German Pat. No. 1,546,316 discloses a binder mixture for neutral or alkaline paper-coating compositions, in which copolymer A of the binder mixture is a copolymer of from 10 to 60% by weight of butadiene, from 30 to 60% by weight of styrene and/or acrylonitrile and from 10 to 50% by weight of esters of ethylenically unsaturated carboxylic acids of 3 to 5 carbon atoms, and from 0 to 10% by weight of other ethylenically unsaturated copolymerizable compounds. Copolymer B of the binder mixture is a copolymer of from 15 to 55% by weight of acrylic acid and/or methacrylic acid, from 0 to 10% by weight of acrylamide and/or methacrylamide and from 85 to 45% by weight of other monomers which form water-insoluble homopolymers, for example acrylic acid esters or methacrylic acid esters. The binder mixture contains from 95 to 60 parts by weight of copolymer A and from 5 to 40 parts by weight of copolymer B.

German Laid-Open Application DOS No. 1,795,303 relates to a special process for the preparation of an aqueous latex, wherein a monomer mixture of from 30 to 80 parts by weight of a conjugated diolefin, from 20 to 70 parts by weight of an aryl-vinyl monomer, from 0.5 to 10 parts by weight of an ethylenically unsaturated carboxylic acid and from 0.1 to 5 parts by weight of an ethylenically unsaturated primary amide is polymerized under defined conditions. The latices are used as binders for paper-coating compositions.

It is true that the conventional dispersions based on butadiene and styrene are good pigment binders, but the use of the aqueous dispersions results in a very troublesome odor nuisance. Even the papers which have been coated with coating compositions containing the conventional butadiene/styrene copolymer dispersions as binders still carry the unpleasant odor of the dispersion. A further disadvantage of the conventional binders based on styrene and butadiene is that their use in starchbased coating compositions does not give products having a stable viscosity. Rather, the viscosity of the coating compositions obtained increases to an undesirable degree after homogenization (this phenomenon being referred to as thickening-up), causing difficulties in using the dispersions.

It is an object of the present invention to provide a binder for the preparation of paper-coating compositions which exhibits improved odor and viscosity characteristics and better pigment-binding capacity.

We have found that this object is achieved, according to the invention, by providing an aqueous dispersion of a copolymer of (a) from 25 to 57.5% by weight of butadiene or of a mixture of butadiene and acrylic acid esters, the content of copolymerized butadiene being at least 15% by weight, (b) from 40 to 70% by weight of styrene, (c) from 1 to 5% by weight of maleic acid or maleic anhydride and (d) from 1.5 to 7% by weight of methacrylamide.

As component (a), the copolymers contain from 25 to 57.5% by weight of butadiene. Part of the copolymerized butadiene can be replaced by esters of acrylic acid with alcohols of 1 to 4 carbon atoms. In that case, the minimum content of copolymerized butadiene is 15% by weight. The content of copolymerized acrylic acid ester in the copolymer is from 0 to 45, preferably from 0 to 25, % by weight. The preferred acrylic acid ester is n-butyl acrylate. Other suitable esters include i-butyl acrylate, tert.-butyl acrylate, propyl acrylate, ethyl acrylate and methyl acrylate. Preferably, from 25 to 50% by weight of the monomers of component (a) are present as polymerized units in the copolymer.

As component (b), the copolymer contains from 40 to 70, preferably from 45 to 65, % by weight of styrene as polymerized units. The higher the styrene content of the copolymer, the harder is the copolymer film. Increasing the styrene content of the copolymers within the above range has no substantial effect on the wet pick resistance of the paper coatings; on the other hand, the dry pick resistance of the coatings diminishes, as expected, with increasing hardness of the copolymers.

If the butadiene in the copolymers is partly replaced by, for example, n-butyl acrylate, the papers coated with these dispersions show less yellowing. As long as the butadiene content in the copolymer does not fall below 15%, the other excellent properties of the dispersion, and of the pigmented coatings produced therewith, are retained.

A further essential constituent of the copolymer is component (c), namely from 1 to 5% by weight of maleic acid or maleic anhydride, and component (d), namely from 1.5 to 7% by weight of methacrylamide.

The particular components (c) and (d) are essential for producing a low-odor aqueous dispersion based on butadiene and styrene, and furthermore the dispersions obtained, when used in starch-based coating compositions, result in only an insignificant increase in viscosity (ie. thickening-up) of the paper-coating composition. This finding was unforeseeable since, for example, replacing the methacrylamide by acrylamide gives very viscous aqueous dispersions and coating compositions, which have unfavorable application characteristics. If the maleic acid or maleic anhydride in the novel copolymer is replaced by methacrylic acid or acrylic acid, the odor of the aqueous dispersion and of the paper-coating compositions deteriorates substantially. If on the other hand copolymers without methacrylamide are produced, the particle size of the dispersion is higher and hence the pigment-binding capacity is lower. It is true that in this case it is possible to reduce the copolymer particle size by increasing the concentration of emulsifier used in the polymerization, but the aqueous dispersions thereby obtained prove unstable in paper-coating compositions and, when used in a sizing press, rapidly produce deposits on the rolls. It was therefore surprising that the choice of components (a) to (d) resulted in aqueous polymer dispersions which have a particularly low level of odor and also give a low level of odor of the polymer film and of the coated papers. The high stability to shear of the novel dispersions—both in the pure form and in the form of the ready-to-use paper-coating composition—ensures that the material processes well even on a sizing press.

The novel aqueous copolymer dispersions are prepared by copolymerizing the monomers in aqueous emulsion by conventional methods. The conventional anionic and/or nonionic emulsifiers are used to emulsify the monomers in water. The polymerization reaction is initiated by conventional free radical polymerization initiators, for example peroxides, hydroperoxides or redox catalysts. The initiators are usually employed in an amount of from 0.3 to 1.5% by weight, based on monomers. The molecular weight can be regulated by conventional chain-transfer agents, for example n-dodecylmercaptan, cyclohexene or carbon tetrachloride, used in amounts of about 0.2–1%, based on monomers. The polymerization temperature can be varied over a wide range, for example from 60° to 100° C. Where redox catalysts are used, the polymerization can also be carried out at from 40° to 60° C.

The polymer concentration in the aqueous dispersion can be varied within a wide range. For economic reasons, dispersions having a high solids content are desirable. Hence, the aqueous dispersions preferably have a solids content of from 20 to 60% by weight.

The copolymers to be used as binders according to the invention can be combined with conventional natural binders, eg. casein or starch. Per part by weight of the synthetic binder, from 0.3 to 3 parts by weight of one or more natural binders are used, the said parts being based on solids. The copolymers used according to the invention can, however, also be employed in paper-coating compositions in combination with conventional thickener dispersions, without resorting to natural binders. Examples of suitable thickener dispersions are disclosed in German Pat. No. 1,546,316, where they are referred to as copolymer B. These copolymers, when present in an aqueous medium, can be thickened by adding a base, ie. the viscosity of the copolymer solution thereupon increases. The copolymers contain from 15 to 55% by weight of acrylic acid or methacrylic acid, from 0 to 10% by weight of acrylamide or methacrylamide and from 85 to 45% by weight of hydrophobic monomers which form water-insoluble homopolymers of which latter group of monomers not less than 20% by weight is accounted for by esters of acrylic acid or methacrylic acid with aliphatic $C_1$–$C_4$-alcohols.

Examples of suitable hydrophobic, ethylenically unsaturated compounds are esters of acrylic acid and of methacrylic acid with higher aliphatic, cycloaliphatic or aromatic hydroxy compounds, styrene, vinyl acetate, vinyl propionate and acrylonitrile. To prepare the paper-coating compositions, mixtures of the synthetic binder and the thickener which contain from 2 to 50% by weight of the synthetic thickener are used.

Per 100 parts by weight of a finely divided pigment, the paper-coating compositions contain from 5 to 25 parts by weight of the copolymer used according to the invention, serving as a binder, from 0.5 to 15 parts by weight of a natural binder or from 0.5 to 5 parts by weight of a synthetic thickener, the stated parts by weight being based on solids in each case. The compositions are prepared by mixing the various components. Suitable pigments especially include clay minerals, calcium carbonates, calcium aluminum pigments and titanium dioxide. Other auxiliaries may also be added to the paper-coating compositions, for example alkali metal hydroxide solutions, eg. sodium hydroxide, or calcium hydroxide or ammonia, white pigments based on water-insoluble urea-formaldehyde condensates or the corresponding melamine-formaldehyde condensates, and other conventional paper auxiliaries, such as urea, melamine, melamine-formaldehyde resins or ureaformaldehyde resins. As a rule, from 0.1 to 5% by weight of a dispersant, for example a low molecular weight polymer of acrylic acid, especially an ammonium salt or sodium salt of a polyacrylic acid having a K value of from 10 to 25, is used to ensure good dispersion of the various components in the aqueous paper-coating composition. The sequence in which the individual components of the paper-coating composition are mixed does not affect the properties of the compositions obtained.

The Examples which follow illustrate the invention. In these, parts and percentages are by weight, unless stated otherwise. The K value of the polymers was measured by the method of H. Fikentscher, Cellulosechemie 13 (1932), 58–64 and 71–74, in 0.5% strength aqueous solution at 25° C.; $K = k.10^3$. The dry pick resistance, determined by the standard test method of the IGT Test, was used as a measure of the pigment binding.

Wet pick test method

The paper strip is clamped on the circular segment of the IGT apparatus, in the same way as when carrying out the dry pick resistance test. A 3.2 cm wide pressure disk is mounted on the upper pressure disk axle and a 2 cm wide inked pressure disk on the lower pressure disk axle. The circular segment carrying the clamped test strip is then turned into the picking position. The pressure setting for both pressure disks is 70 kp. 0.2 $cm^3$ of water is then dripped between the circular segment carrying the clamped test strip and the upper pressure disk and picking is effected immediately at a constant speed which should be set at from 18 to 40 cm/s, since the water otherwise acts for too short a time.

To evaluate the test, the depth of color of the test strip is measured and the corresponding D value is related to that of a strip printed over its entire area.

$$\text{Wet pick resistance} = \frac{D \text{ value of test strip} \cdot 100}{D \text{ value of overall print}}$$

Odor test (a) Triangle test, described in U.S. Dept. Agr., Bi-Annual Report, Bur. Agr. Econ. 1(1950)
(b) Robinson test, described in Verpackungs-Rundschau 12 (1961), No. 3, 17–22.

The result is rated in accordance with the following:
1 = no odor
up to 6 = strong odor The viscosities were measured on a Brookfield viscometer with a shearing rate of 20 or 100 revolutions per minute (rpm).

A. Preparation of dispersions based on butadiene and styrene

Dispersion 1

17 kg of water, 0.6 kg of a 15% strength aqueous sodium lauryl-sulfate solution, 0.1 kg of a 20% strength aqueous sodium lauryl-sulfonate solution and 1 g of tetrasodium ethylenediaminetetraacetate are introduced into a 150 liter polymerization reactor, flushed with nitrogen and heated to 80° C. When the mixture has reached this temperature, 8 liters of an emulsion are run in from a feed vessel over 3 minutes, the emulsion having been prepared by mixing 24 kg of butadiene, 24 kg of styrene, 1 kg of maleic acid, 2 kg of methacrylamide, 0.25 kg of tertiary dodecyl mercaptan, 2.6 kg of a 15% strength aqueous sodium laurylsulfate solution and 23 kg of water. From a second feed vessel, containing a solution of 0.5 kg of ammonium peroxydisulfate in 7 kg of water, 1 liter of the said solution is then run into the polymerization reactor over 2 minutes. The mixture initially introduced into the polymerization reactor is first stirred for 20 minutes at 80° C. The remainder of the monomer emulsion and the remainder of the peroxydisulfate solution are then metered in over 4 hours, after which the reaction mixture is polymerized for a further 3.5 hours at 80° C. An aqueous dispersion having a solids content of about 50% is obtained. The polymer dispersion is neutralized with aqueous ammonia and is then treated with steam under reduced pressure in order to deodorize it and remove the residual monomers. The mean size of the polymer particles in the dispersion is from about 80 to 200 nm. The dispersion has a very low odor, is speck-free and has a low viscosity (400–800 mPas at 20 rpm and 150–250 mPas at 100 rpm).

Comparative dispersion 1

If the methacrylamide used to prepare dispersion 1 is replaced by the same amount of acrylamide, the viscosity of the aqueous dispersion increases to the extent that the dispersion can no longer be pumped and is accordingly unsuitable for subsequent processing.

Comparative dispersion 2

The method described for dispersion 1 is modified by employing 1.5 kg (3%) of acrylamide in place of the methacrylamide. Once again, the viscosity of the aqueous dispersion obtained, at pH 6 and a solids content of 50%, is such that the dispersion has unfavorable processing characteristics. Specifically, the viscosity is 2800–3600 mPas at 20 rpm and 1000–1300 mPas at 100 rpm.

For easy processability, the viscosity of the aqueous dispersion should be less than 1000 mPas at 20 rpm and less than 400 mPas at 100 rpm.

Comparative dispersion 3

If a dispersion is prepared by the method described for dispersion 1, but without any methacrylamide, the product has a coarser particle size.

Coating compositions containing this dispersion as the binder give unsatisfactory dry pick resistance of the coated papers if the binder content of the coating composition is less than 10%.

Comparative dispersion 4

If a dispersion is prepared by the method described for dispersion 1, but the maleic acid is replaced by the same amount of (a) methacrylic acid or, in another polymerization batch,
(b) acrylic acid, the aqueous dispersion obtained in both cases has an unpleasant odor which is also shown by the polymer film and by the paper coated with the coating compositions containing these copolymer dispersions as binders.

In an odor test carried out by 15 persons it was found unanimously that the dispersions containing acrylic acid or methacrylic acid had a significantly more unpleasant odor than dispersion 1, which contained maleic acid.

Comparative dispersion 5

Using the method described for dispersion 1, a dispersion in which the maleic acid is replaced by the same amount of fumaric acid is prepared. Because of the lower solubility of fumaric acid in water, blockages of the metering and filtering equipment occur on metering in the fumaric acid. The dispersion obtained furthermore contains specks.

If no carboxyl-containing monomer is added when preparing the dispersions, the latter are less compatible with pigments. Furthermore, the viscosity of starch-containing paper-coating compositions increases so greatly on storage that the compositions can no longer be processed on high-speed coating machines.

Comparative dispersion 6

A dispersion is prepared by the method described for dispersion 1, but containing a total of 2.5 kg (5%) of methacrylamide and no maleic acid.

Dispersion 2

Using the method described for dispersion 1, an aqueous dispersion containing 2.5 kg (5%) instead of 2 kg of methacrylamide as copolymerized units is prepared.

B. Preparation of paper-coating compositions

EXAMPLE 1

400 g of a coating clay are introduced, under the action of high shearing forces (in a dissolver), into 200 kg of water in which 1.2 g of polyphosphate in 0.4 g of sodium hydroxide have been dissolved. The pigment suspension is dispersed for 20 minutes, and 160 g of a 30% strength aqueous solution of an oxidatively degraded potato starch and 32 g of the 50% strength aqueous dispersion 2 are then added, whilst stirring.

For comparison, a coating composition containing 32 g of the 50% strength aqueous comparative dispersion 6 in place of dispersion 2 is prepared.

The viscosity of both coating compositions is measured, at a solids content of 56% and at pH 7, after one hour and after standing for 4 hours. A particularly troublesome feature in carrying out the coating operation is the great tendency to thickening-up of the coating compositions if they have been prepared with comparative dispersion 6. The paper-coating compositions have the following viscosities:

| Paper-coating composition for which the binder is | Viscosity [mPas] measured | | | |
|---|---|---|---|---|
| | at 20 rpm after | | at 100 rpm after | |
| | 1 h | 4 h | 1 h | 4 h |
| Comparative dispersion 6 | 6,000 | 40,500 | 2,240 | 10,000 |
| Dispersion 2 | 4,000 | 4,500 | 1,200 | 1,450 |

An industrially useful paper-coating composition must have a viscosity not exceeding 2,500 mPas at 100 rpm after one hour and after 4 hours. Accordingly, the paper-coating composition obtained with comparative dispersion 6 cannot be used.

Further dispersions and comparative dispersions are prepared by the method described for dispersion 1, and are used for preparing paper-coating compositions as described in Example 1. Table I shows the compositions of the polymer dispersions and the dry pick resistance and wet pick resistance of coated papers.

EXAMPLE 2

400 g of an English coating clay are introduced, under the action of high shearing forces (in a dissolver), into 200 kg of water in which 1.2 g of sodium polyacrylate in 0.4 g of sodium hydroxide have been dissolved. The pigment suspension is dispersed for 20 minutes, and 84 kg of the 50% strength dispersion 1 and 7 kg of the 30% strength thickener dispersion disclosed in German Pat. No. 1,546,316, Example 1, and consisting of 75% of ethyl acrylate, 20% of acrylic acid and 5% of acrylamide as copolymerized units, are then added, whilst stirring. The coating composition is then brought to pH 8–9 with 20% strength sodium hydroxide solution and the solids content is adjusted to 58% with water.

For comparison, a paper-coating composition is prepared according to the above procedure but using comparative dispersion 4b in place of dispersion 1, the former having a similar solids content and similar viscosity (about 1,000 mPa.s/100 rpm on a Brookfield viscometer).

The two coating compositions are applied by means of a blade coater to both sides of a wood-containing coating base-paper, the machine runs at 800 m/min, applying 11 g of coating/m² to each face. The paper is then satinized in a supercalender.

Tests on the coated papers give the following results:

| | Dry pick resistance cm/sec | Wet pick resistance % | Odor (Robinson test) Rating |
|---|---|---|---|
| Dispersion 1 | TS[1] 61 WS[2] 71 | 30.1 49 | 2 |
| Comparative material according to German Patent 1,546,316 | TS 49 WS 54 | 20.7 33.3 | 4 |

[1] Topside of paper
[2] Wire side of paper

Relative to the Comparative Example, the papers obtained using dispersion 1 have more than 20% higher

TABLE I

| Dispersion | No. | Bu % | St % | iBA % | nBA % | MA % | MAM % | Others | Dry pick resistance cm/sec | Wet pick resistance % | Notes |
|---|---|---|---|---|---|---|---|---|---|---|---|
| | 1 | 47 | 47 | — | — | 2 | 4 | — | 197 | 48 | Dispersions |
| | 2 | 46.5 | 46.5 | — | — | 2 | 5 | — | 203 | 62 | have a very |
| | 3 | 47.5 | 47 | — | — | 4 | 1.5 | — | 200 | 56 | low odor |
| | 4 | 20 | 48 | — | 28 | 2 | 2 | — | 148 | 47 | and pro- |
| | 5 | 34.5 | 40 | 20 | — | 2.5 | 3 | — | 183 | 37 | cess |
| | 6 | 30 | 65 | — | — | 2 | 3 | — | 92 | 47 | easily |
| Comparative dispersion | 3 | 48 | 48 | — | — | 2 | — | — | 110 | 12 | Coating composition is unstable on a sizing press |
| | 6 | 47.5 | 47.5 | — | — | — | 5 | — | 194 | 45 | Viscosity of a starch-based coating composition is too high |
| | 7 | 47.5 | 47 | — | — | — | 2 | 3.5 AA | 192 | 27 | Strong odor |
| | 8 | 47.5 | 47.5 | — | — | — | 2 | 3 MAA | 172 | 25 | Strong odor |

Bu: 1,3-butadiene
St: styrene
iBA: isobutyl acrylate
nBA: n-butyl acrylate
MA: maleic acid
MAM: methacrylamide
AA: acrylic acid
MAA: methacrylic acid dry pick resistance and about 50% higher wet pick resistance. Furthermore, the paper coated with the composition based on dispersion 1 has a substantially lower odor than that obtained using the comparative dispersion from German Pat. No. 1,546,316.

We claim:

1. An aqueous dispersion of a butadiene-styrene copolymer which comprises:
   (a) from 25 to 57.5% by weight of a mixture of butadiene and copolymerized units of an acrylic acid ester of an alcohol of 1 to 4 carbon atoms, said mixture not being less than 15% by weight of butadiene units,
   (b) from 40 to 70% by weight of styrene,
   (c) from 1 to 5% by weight of maleic acid or maleic anhydride and
   (d) from 1.5 to 7% by weight of methacrylamide, as copolymerized units.

2. A binder dispersion as claimed in claim 1, which contains, as an auxiliary, from 2 to 50% by weight, expressed as solids/solids, of a copolymer which acts as a thickener and contains, as copolymerized units, from 15 to 55% by weight of acrylic acid or methacrylic acid, from 0 to 10% by weight of acrylamide or methacrylamide and from 85 to 45% by weight of hydrophobic monomers which form water-insoluble homopolymers.

3. Paper coated with the aqueous dispersions of claims 1 or 2.

4. The aqueous dispersion according to claims 1 or 2 further comprising 0.3 to 3 parts by weight of natural binders per part by weight of synthetic binder.

5. The aqueous dispersion of claim 4 wherein said natural binders are casein or starch.

6. The aqueous dispersion according to claims 1 or 2 further comprising 100 parts of a pigment per 5 to 25 parts by weight of said butadiene-styrene copolymer.

7. The aqueous dispersion according to claim 6 wherein said pigments are clay minerals, calcium carbonates, calcium aluminum pigments or titanium dioxide.

8. A method for treating paper comprising coating said paper with the aqueous dispersion of claims 1 or 2.

9. The aqueous dispersion of claim 1 wherein the ester is n-butyl acrylate.

* * * * *